UNITED STATES PATENT OFFICE.

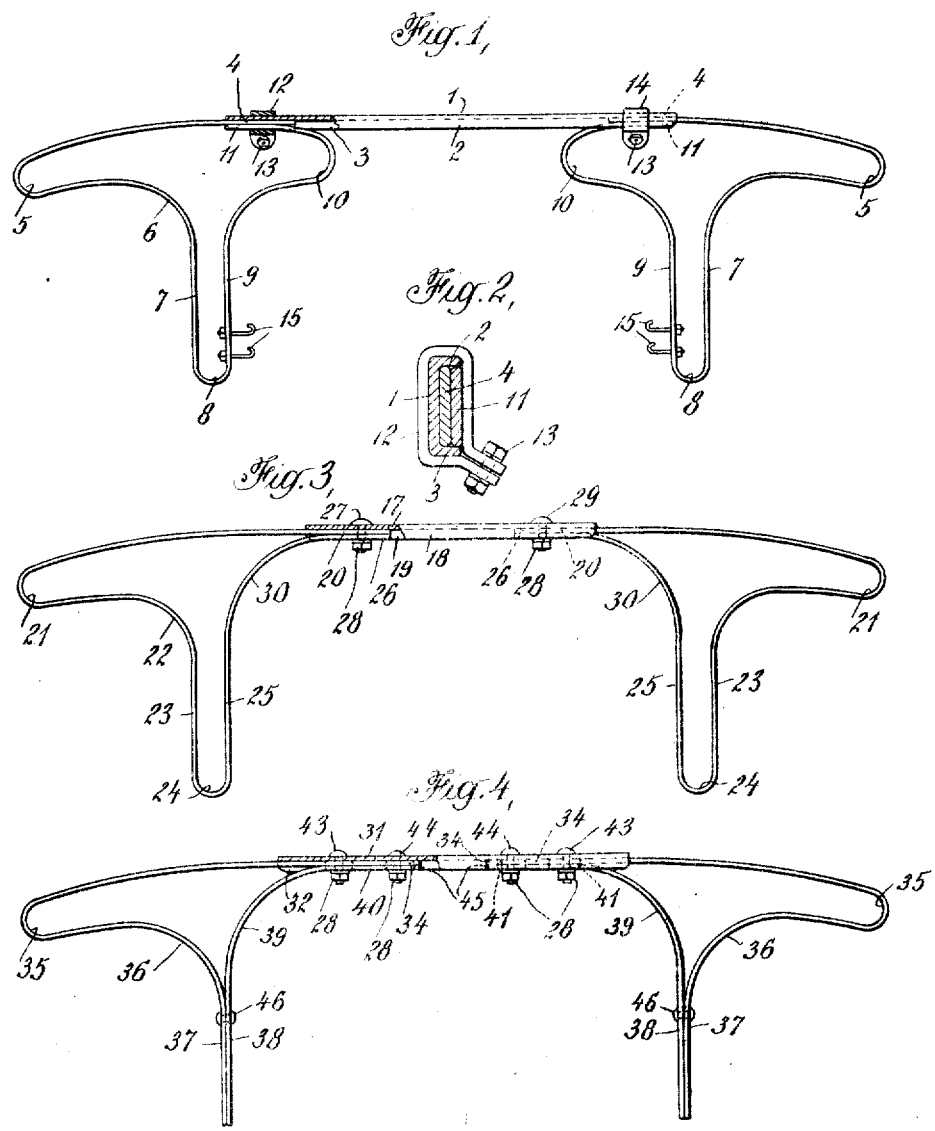

GEORGE ALBERT LYON, OF PHILADELPHIA, PENNSYLVANIA.

RESILIENT-LOOP-ATTACHER BUMPER.

1,357,505.   Specification of Letters Patent.   Patented Nov. 2, 1920.

Application filed January 21, 1920. Serial No. 353,068.

*To all whom it may concern:*

Be it known that I, GEORGE ALBERT LYON, a citizen of the United States and resident of Philadelphia, county of Philadelphia, State of Pennsylvania, have made a certain new and useful Invention Relating to Resilient-Loop-Attacher Bumpers, of which the following is a specification, taken in connection with the accompanying drawing.

This invention relates especially to bumpers or buffers for automobiles or other vehicles in which the attaching members which may be formed of spring steel or other resilient strip may be of duplex character and provided with attacher loops in some cases, these attaching members being formed with resilient loops forming the buffer ends and projecting considerably out beyond the centrally arranged front connector members which may be of spring strip or channel construction adjustably or otherwise clamped or secured to the attaching members. Each attaching member may, if desired, be of the same shape so as to minimize manufacturing expense and may comprise in addition to the buffer end loop another looped or curved connector portion adapted to be clamped or held in close coöperative engagement with the other connecting end of the attaching member and with the spring channel or other front connector which preferably has substantial vertical alining action on these parts so as to prevent undesirable movement under running conditions.

In the accompanying drawing showing in a somewhat diagrammatic way illustrative embodiments of the invention, Figure 1 is a plan view of one illustrative construction shown partly in section.

Fig. 2 is an enlarged transverse view through one of the clamping devices thereof; and Figs. 3 and 4 are plan views showing other constructions, parts being broken away for greater clearness.

If desired, the duplex attaching members may each be of the same general shape and each may be formed of a single bent up strip of tempered spring steel. This spring steel strip of which one or more thicknesses may be used for each attaching member as desired may for a single thickness strip be a quarter of an inch to three-eighths of an inch thick and two inches more or less wide, the width of the spring being preferably arranged in a substantially vertical direction to give the desired increased vertical rigidity to the buffer element. As shown in Fig. 1 one of these spring strip attaching end loop elements may have a connector end portion 4 merging into an end loop 5 for acting as an impact receiving member or portion of the buffer adjacent its end. Then this element continues as the curved yielding portion 6 and the duplex looped attaching portion 7, 9 joined by the resilient attacher loop 8 so that the inturned protected securing portion 9 is spaced away sufficiently from the outer portion or strip 7 to give ample space for adjusting and securing the nuts on the hook bolts or other attaching devices 15 by which the element may be adjustably and securely connected to the frame member of an automobile. The inner attaching portion 9 may be provided with an inwardly turned connector loop 10, the end of this connector portion 11 substantially overlapping the other connector end 4 of this spring strip element so that both may be clamped, bolted or otherwise secured to a front connector element of the buffer of any suitable construction. A front connector 1 of spring channel type may be used for this purpose and as indicated in Figs. 1 and 2 the relatively shallow top and bottom flanges 2, 3, preferably fit sufficiently closely to the coöperating connector portions of the resilient buffer elements so as to exert considerable alining action thereon when the parts are adjustably or otherwise secured together as by the inclosing clamping device or clip 12 at one end provided with the bolt 13 as indicated. A similar inclosing clip or clamping device 14 may be used adjacent the other end of the front connector to rigidly secure thereto the other spring strip element extending out beyond this connector to form a resilient loop end of the buffer. In this way these three main elements of the buffer front, all of which may be of a more or less resilient character, may be securely connected in adjusted position so that the width of the buffer may be adjusted to fit automobiles having frame members located at different distances apart.

In the Fig. 3 device the duplex attaching members may comprise the attacher loops 24 and the substantially parallel or spaced apart portions 23, 25, the outer strip continuing as the curved yielding portion 22 and the buffer end loop 21 to which the connector portion or strip end 20 is connected. The inner attaching member 25 may have any suitable form of connecting portion, such as the connector end 26 and the curved yielding portion 30, if desired. Both of these connector ends of each attaching member or buffer element may be adjustably or otherwise connected to a suitable front connector such as the spring or other channel section connector 17 having the flanges 18, 19 and within which these connector ends may be adjustably and securely bolted as by the bolts 27, 29 preferably having somewhat ornamental rounded heads on the front of the buffer, the nuts 28 being more or less concealed or at least rendered considerably less prominent by being behind and below the front and upper edges of this connector while the connector ends of the spring strips are practically concealed by the inclosing channel connector.

In the illustrative type of construction shown in Fig. 4, the duplex attaching member may comprise several strips, such as 37, 38, which may, if desired, be connected adjacent their rear ends which may of course be perforated or provided with slots and apertures to accommodate the hook bolts or other attaching devices used. These spring steel or other resilient strips may be permanently connected by spot welding in some cases or by the use of one or more rivets, such as 46, which hold the strips in alinement and more closely connect them at about this point. The inner strip 38 may have a curved yielding portion 39 of any suitable character merging into the connector portion 40, the other strip having a coöperating connector portion 34 extending outwardly as the end of the impact receiving portion of the buffer, an end loop 35 and curved yielding portion 36 being formed on this element, if desired. The coöperating connector portions 34, 40 of each of these resilient elements may have their ends 45 substantially in line and may be adjustably or otherwise connected to a resilient or other channel front connector 31 having its web provided with slots or apertures, if desired, and the flanges 32, 33 of this connector fitting sufficiently tightly to have at least considerable vertical alining action on the coöperating connector portions of the resilient strip elements. If desired one or more bolts, such as 43, 44, may connect each of the spring strip elements to this front connector and if desired provide an adjustment between these parts when slots as 41 are formed in either of the elements through which the bolts pass as indicated in dotted lines in connection with the connector portions of the spring strips.

This invention has been described in connection with a number of illustrative forms, proportions, parts, arrangements, materials, methods of connection and use, to the details of which disclosure the invention is not of course to be limited, since what is claimed as new and what is desired to be secured by Letters Patent is set forth in the appended claims:

1. The resilient automobile buffer comprising two substantially similar spring strip end loop attaching elements, each having duplex, spaced apart attaching portions comprising an inturned protecting securing portion adapted to be secured to an automobile frame member and having a connector portion, adjacent impact receiving portion and end loop adapted to form a resilient buffer end and having an inwardly turned connector loop coöperating with the adjacent connector portion of the element, and a spring channel front connector having flanges coöperating with and substantially alining the connector portions of said elements and inclosing clamping devices to adjustably connect the ends of said front connector with the connector portions of said elements.

2. The resilient automobile buffer comprising two spring strip end loop attaching elements, each having duplex attaching portions adapted to be secured to an automobile frame member and having a connector portion, adjacent impact receiving portion and end loop adapted to form a resilient buffer end and having an inwardly turned connector loop, and a spring channel front connector having flanges coöperating with the connector portions of said elements and inclosing clamping devices to adjustably connect the ends of said front connector with the connector portions of said elements.

3. The resilient automobile buffer comprising two substantially similar spring strip end loop attaching elements, each having attaching portions adapted to be secured to an automobile frame member and having a connector portion and end loop adapted to form a resilient end of the buffer front and having an inwardly extending connector portion coöperating with the adjacent connector portion of the element, and a channel front connector having flanges coöperating with the connector portions of said elements and clamping connector devices to adjustably connect the ends of said front connector with the connector portions of said elements.

4. The resilient automobile buffer comprising two substantially similar spring strip end loop attaching elements, each having attaching portions adapted to be secured to an automobile frame member and having a connector portion and end loop adapted to form a resilient end of the buffer front, and a channel front connector having flanges coöperating with the connector portions of said elements and clamping connector devices to connect the ends of said front connector with the connector portions of said elements.

5. The resilient automobile buffer comprising two substantially similar resilient strip end loop attaching elements, each having duplex attaching portions adapted to be secured to an automobile frame member and having a connector portion, adjacent impact receiving portion and end loop adapted to form a resilient buffer end and having an inwardly extending connector portion coöperating with the adjacent connector portion of the element, and a flanged resilient front connector having a flange coöperating with and substantially alining the connector portions of said elements and inclosing clamping connector devices to adjustably connect the ends of said front connector with the connector portions of said elements.

6. The resilient automobile buffer comprising two resilient strip end loop attaching elements, each having attaching portions adapted to be secured to an automobile frame member and having a connector portion, adjacent impact receiving portion and end loop adapted to form a resilient buffer end and having an inwardly extending connector portion coöperating with the adjacent connector portion of the element, and a flanged resilient front connector having a flange coöperating with the connector portions of said elements and connector devices to connect the ends of said front connector with the connector portions of said elements.

7. The resilient automobile buffer comprising two resilient strip end loop attaching elements, each having attaching portions adapted to be secured to an automobile frame member and having a connector portion and end loop adapted to form a resilient buffer end, and a flanged resilient front connector having a flange coöperating with the connector portions of said elements and connector devices to connect the ends of said front connector with the connector portions of said elements.

GEORGE ALBERT LYON.